United States Patent [19]

Parks et al.

[11] Patent Number: 5,148,094
[45] Date of Patent: Sep. 15, 1992

[54] CHARGER WITH UNIVERSAL BATTERY PACK RECEPTACLE

[75] Inventors: James R. Parks, Timonium; Roderick F. Bunyea, Westminster; John R. Dixon, Hampstead; Robert A. Meloni, Baltimore, all of Md.

[73] Assignee: Black & Decker Inc., Newark, Del.

[21] Appl. No.: 566,028

[22] Filed: Aug. 10, 1990

[51] Int. Cl.$^5$ .......................................... H01M 10/46
[52] U.S. Cl. .......................................... 320/2; 320/15
[58] Field of Search ...................................... 320/2, 15

[56] References Cited

U.S. PATENT DOCUMENTS

| | | | |
|---|---|---|---|
| 2,451,726 | 10/1948 | Fry | 320/4 |
| 4,214,197 | 7/1980 | Mann | 320/2 |
| 4,303,876 | 12/1981 | Kelly, III et al. | 320/2 |
| 4,403,182 | 9/1983 | Yeh | 320/2 |
| 4,558,270 | 12/1985 | Liautaud et al. | 320/2 |
| 4,636,703 | 1/1987 | Tohya et al. | 320/2 |
| 4,766,361 | 8/1988 | Pusateri | 320/2 |
| 4,873,479 | 10/1989 | Iimura et al. | 320/2 |

FOREIGN PATENT DOCUMENTS 2702129 1/1977 Fed. Rep. of Germany.

Primary Examiner—R. J. Hickey
Attorney, Agent, or Firm—Dennis A. Dearing; John D. Del Ponti; Charles E. Yocum

[57] ABSTRACT

A charger 11 is configured to receive alternatively for charging, one at a time, battery packs having three different shapes, namely, a large oval pack 213 (FIG. 10), a small oval pack 219 (FIG. 11) and a D-shaped pack 225 (FIG. 12). When pack 219) is inserted into receptacle 25, a pack locater 77 biases pack 219 against the receptacle sidewall 29 and into a location to properly mate with electrical contacts 65, 66. When pack 225 is inserted into receptacle 25, locater 77 biases pack 225 against a retractable abutment 85 spaced from locater 77 and into a proper location to mate with contacts 65, 66. When pack 213 is inserted into receptacle 25, receptacle contacts 47, 49 mate with pack terminals 24. When pack 213 is in receptacle 25, contacts 65, 66, pack locater 77 and abutmet 85 serve no function and are substantially retracted from receptacle 25 by engagement with pack sidewall 216. Thus, charger 11 is automatically adaptable for charging a plurality of battery pack designs in a simple and low cost manner.

21 Claims, 8 Drawing Sheets

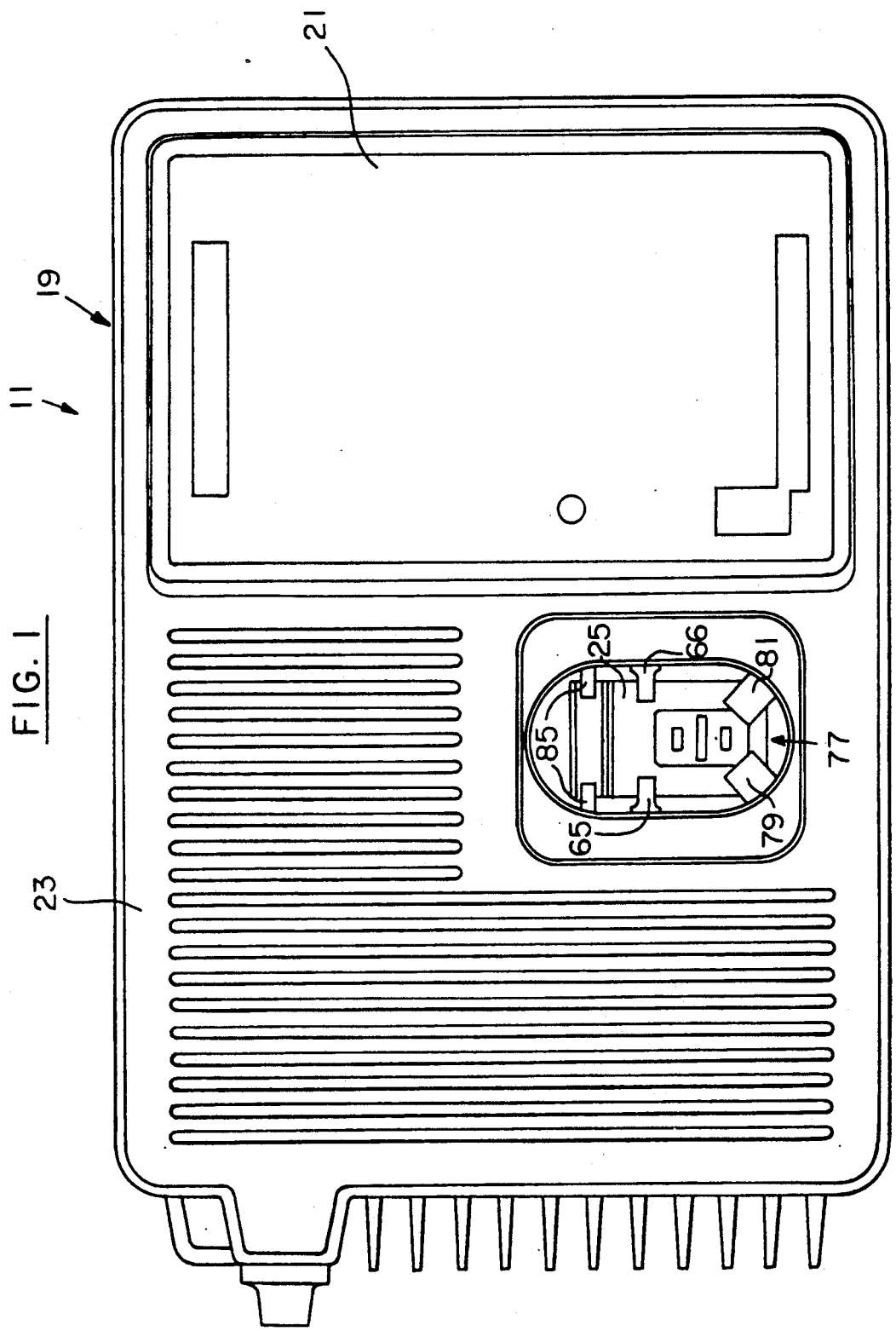

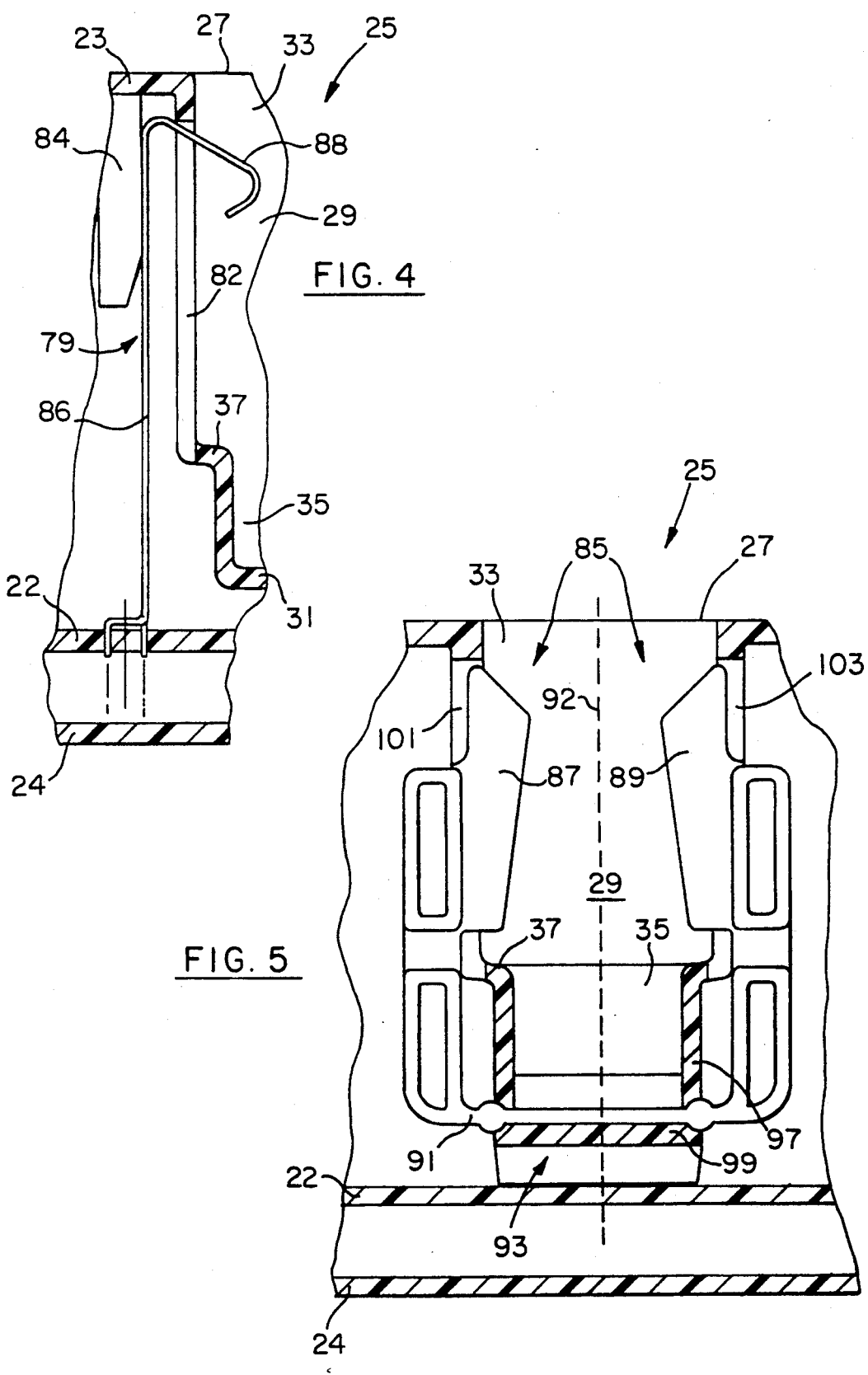

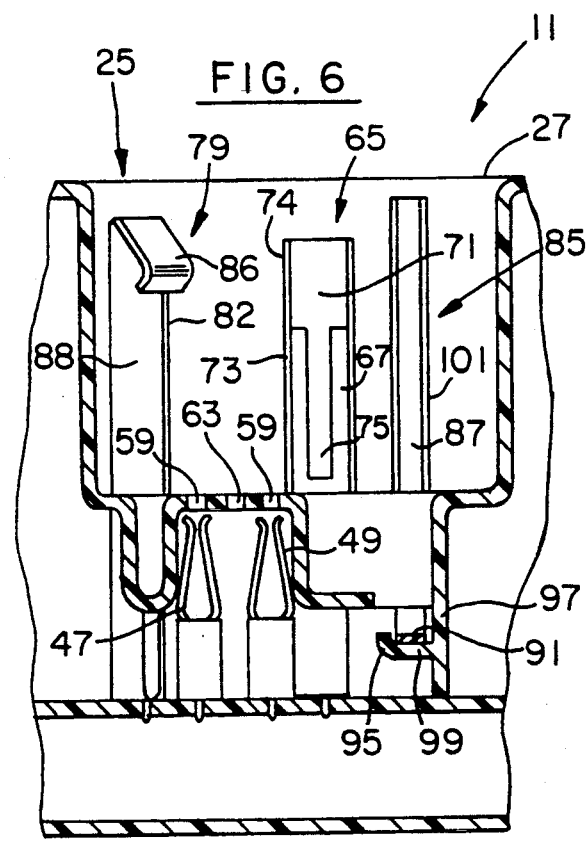

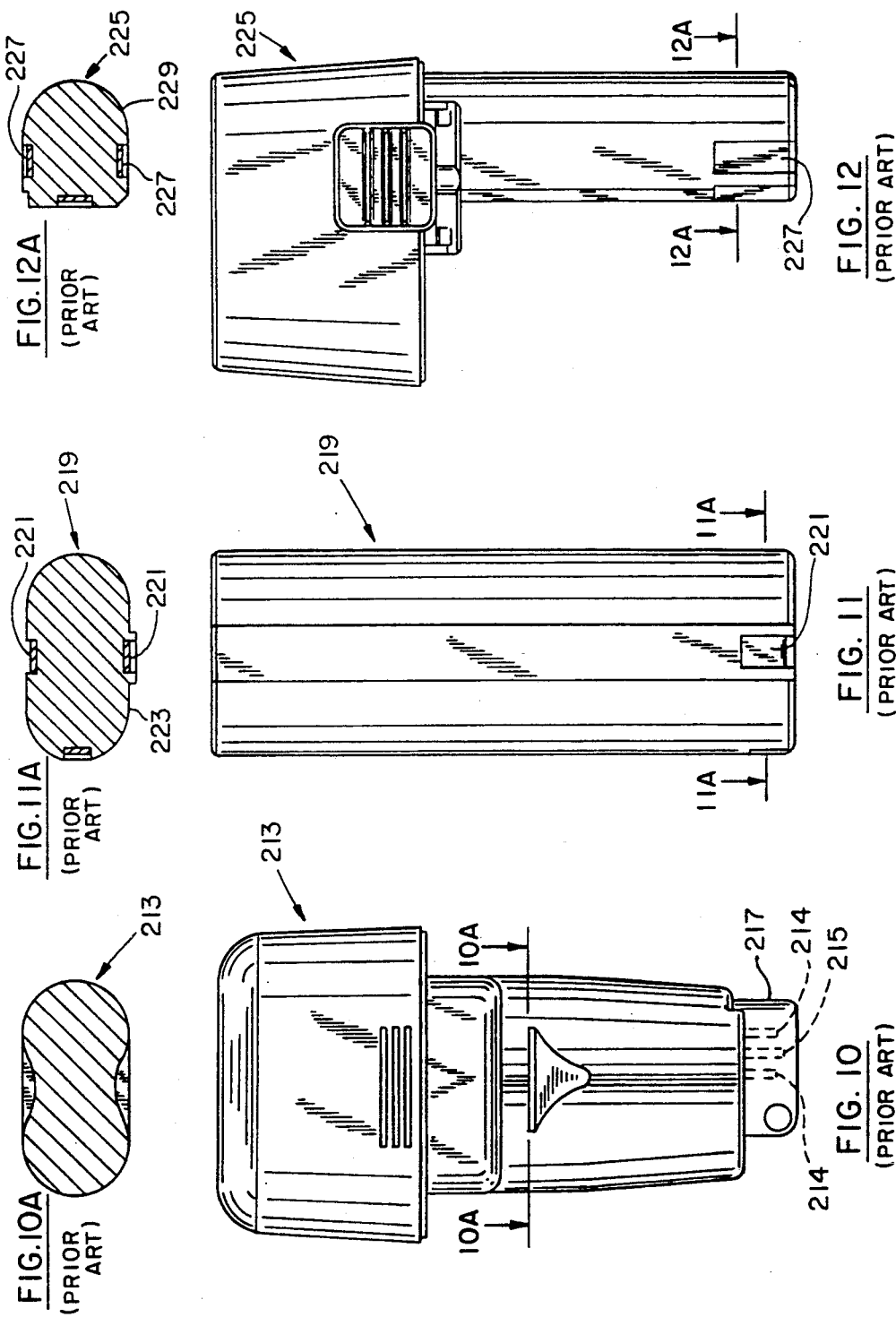

CHARGER WITH UNIVERSAL BATTERY PACK RECEPTACLE

BACKGROUND OF THE INVENTION

This invention is directed to battery chargers and more particularly to battery chargers for recharging battery packs (for example, of nickel-cadmium cells) commonly used as a power supply for power tools, appliances and similar devices driven by small motors.

For cordless power tools, there are a wide variety of commercially available designs for removable, rechargeable battery pack power supplies. The designs have proliferated because of the evolution of power tools designs from a single manufacture as well as the different pack designs originating from different manufactures. As the designs are not standardized among manufacturers and not fully standardized by each individual manufacturer it has been necessary to provide a specialized charger for each of the various pack designs. Recently there has been a trend by individual manufacturers to increase the standardization of its packs for a variety of power tools and to provide chargers for recharging more than one of its pack designs.

One approach has been to provide a charger with multiple specialized receptacles. Each receptacle can receive only one pack design. This approach is disadvantageous because the resulting charger tends to be larger and more expensive because of the multiple receptacles. Another approach has been to provide a charger with a single receptacle and interchangeable inserts for the receptacle to accommodate different packs designs and is exemplified by German Patent Application No. DT 2,702,129. This approach has been found to be disadvantageous because the added cost of the interchangeable inserts and because of inconvenience of storing and retaining the inserts not in use. A third approach exemplified in U.S. Pat. No. 4,873,479 has been to provide a charger with a single large receptacle subdivided into two smaller chambers. One chamber corresponds to one battery pack design and the second portion corresponds to a second battery pack design. The third approach is disadvantageous because of the requirement to have a small chamber corresponding in size and shape to each pack design.

An object of this invention is to provide a more universal charger which may be used to recharge battery pack designs available from a number of manufacturers. Three commercially available battery pack designs which may be recharged in a battery charger in accordance with this invention are shown in FIGS. 10-12. FIG. 10 shows a battery pack 213 which is available from a single manufacturer (Black & Decker) and is currently used as a power supply for a plurality of power tools. Pack 213 has a transverse large oval cross-section (as shown in FIG. 10A) and has a pair of terminals 214 separated by an insulator 215 and shielded by shroud 217. FIGS. 11, 12 shows battery packs 219, 225 which are exemplary of battery pack designs available from a number of manufacturers and which are used as a power supply for a variety of power tools. Pack 219 has a transverse small oval cross-section (as shown in FIG. 11A) and has a pair of terminals 221 at opposed locations on the sidewall 223 of pack 219. Pack 225 has a D-shaped cross-section (as shown in FIG. 12A) and has a pair of terminals 227 at opposed locations on the sidewall 229 of pack 225.

The present invention overcomes many of the disadvantages associated with prior art battery chargers for a plurality of battery pack designs by providing a battery charger having a single receptacle (1) sized and shaped to accommodate one of a plurality of battery pack designs and (2) automatically adapted to receive alternate pack designs upon insertion of the alternate pack.

In accordance with another aspect of the invention, a charger comprises a housing and a receptacle for alternatively receiving a plurality of battery packs having different cross-sectional areas. The receptacle has a sidewall and an opening formed in a housing wall and circumscribing a first area. The area of the opening corresponds approximately to the transverse cross-sectional area of one of the packs. Electrical contacts in the receptacle electrically contact the respective terminals of the plurality of packs. A retractable abutment extends from the sidewall into the receptacle for abutting a second pack having a transverse cross-sectional area smaller than the area of the receptacle opening and smaller than the transverse cross-sectional area of the first pack. The abutment is resiliently retractable from the receptacle when the first pack is in the receptacle.

In accordance with a still further aspect of the invention, a charger comprises a universal receptacle which can accommodate a plurality of battery packs having different cross-sectional areas. The receptacle has opening that is sized to correspond approximately to the cross-sectional area of one of the packs. A pack positioning means in the receptacle positions a second pack smaller than the first pack to properly contact the electrical charger contacts. The positioning means is resiliently retractable when the first larger pack is inserted into the receptacle. The positioning means may be comprised by the pack locator or by the retractable abutment or by both.

Additional objects and advantages of the invention will be apparent from the detailed description of the preferred embodiment or may be learned by the practice of the invention.

SUMMARY OF THE INVENTION

According to the invention, a charger comprises a housing and a receptacle for alternately receiving a plurality of battery packs having different cross-sectional areas. The receptacle has an opening formed in a housing wall and circumtending a first area and a sidewall. The area of the opening corresponds approximately to the transverse cross-sectional area of one of the packs. Electrical contacts in the receptacle electrically contact the respective terminals of the plurality of packs. A pack locater in the receptacle biases a second of the plurality of packs into a location in the receptacle to contact the electrical contacts. The locater is resiliently retractable when the first pack is inserted into the receptacle. The second pack has a transverse cross-sectional area less than the area of the receptacle opening.

The locater preferably extends outwardly from a first position on the sidewall and biases the second pack into engagement with the sidewall at a second position opposed to the first position.

The locater preferably comprises a pair of resilient spaced fingers.

The charger may further comprise a retractable abutment for abutting a third pack having a transverse cross-sectional area smaller than the area of the receptacle opening and smaller than the transverse cross-sectional area of the second pack. The locater biases the third pack inserted into the receptacle toward and into engagement with the abutment.

The abutment preferably comprises two arms extending respectively into the receptacle from opposed positions on the sidewall. The arms are resiliently retractable into the sidewall when the first pack is inserted into the receptacle.

The electrical contacts preferably include a first pair of electrical contacts extending through the receptacle floor. The pair of contacts are electrically connectable to the terminals of the first pack when the first pack is inserted into the receptacle. A second pair of electrical contacts extend from the sidewall at mutually opposed positions. The second pair of contacts are alternatively electrically connectable to the terminals of the second and third packs when one of the packs is inserted in the receptacle.

BRIEF DESCRIPTION OF THE DRAWINGS

The accompanying drawings which are incorporated in, and constituted part of, this specification illustrate one embodiment of the invention and together with the description serve to explain the principles of the invention.

FIG. 1 is a top plan view of a charger in accordance with the preferred embodiment of the invention.

FIG. 4 is a fragmentary cross-sectional view of the charger receptacle taken along line 4—4 FIG. 2. Background parts are not shown for clarity.

FIG. 5 is a cross-sectional view of the charger receptacle taken along line 5—5 of FIG. 2.

FIG. 6 is a cross-sectional view of the charger receptacle taken along line 6—6 of FIG. 2.

FIG. 10 is a side elevational view of a prior art large oval pack.

FIG. 10A is a transverse cross-sectional view of the large oval pack taken along line 10A—10A of FIG. 10.

FIG. 11 is a side elevational view of a prior art small oval pack.

FIG. 11A is a transverse cross-sectional view of the small oval pack taken along line 11A—11A of FIG. 11.

FIG. 12 is a side elevational view of a prior art D-shaped pack.

FIG. 12A is a transverse cross-sectional view of the D-shaped pack taken along line 12A—12A of FIG. 12.

DESCRIPTION OF THE PREFERRED EMBODIMENT

The preferred embodiment of a battery charger 11 in accordance with the invention is shown in FIGS. 1-9. Exemplary prior art battery packs which are chargeable in charger are shown in FIGS. 10-12. FIGS. 13, 14 and FIGS. 15, 16 show respectively second and third nonpreferred embodiments of a battery charger in accordance with the invention.

Figure 2:
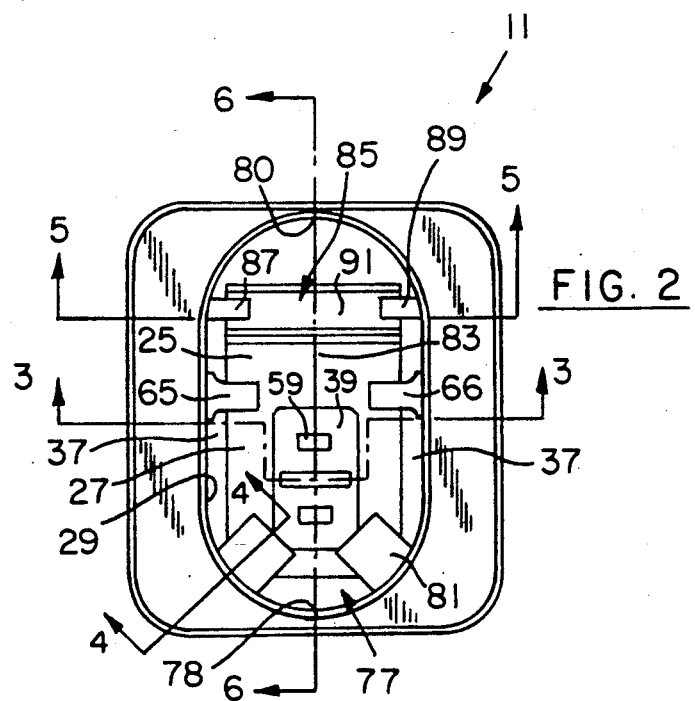
FIG. 2 is a top plan view of the receptacle of the charger shown in FIG. 1.
Figure 7:
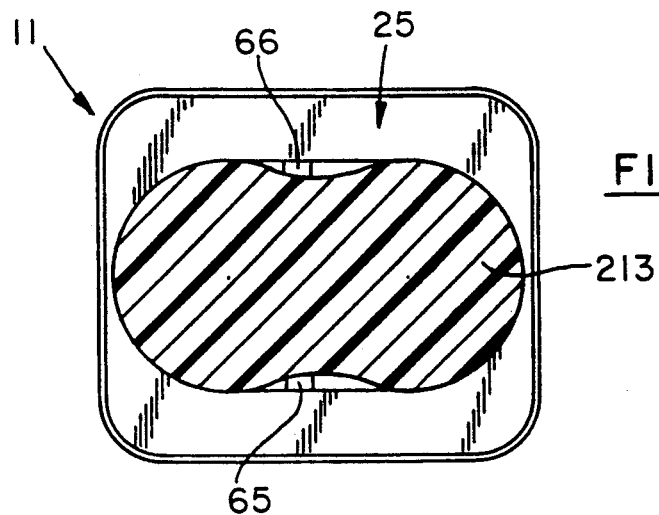
FIG. 7 is a top plan view of the charger receptacle of FIG. 2 with a large oval pack mounted in the receptacle. The pack is cross-sectioned in a plane coplanar with the plane of the receptacle opening.
Figure 8:
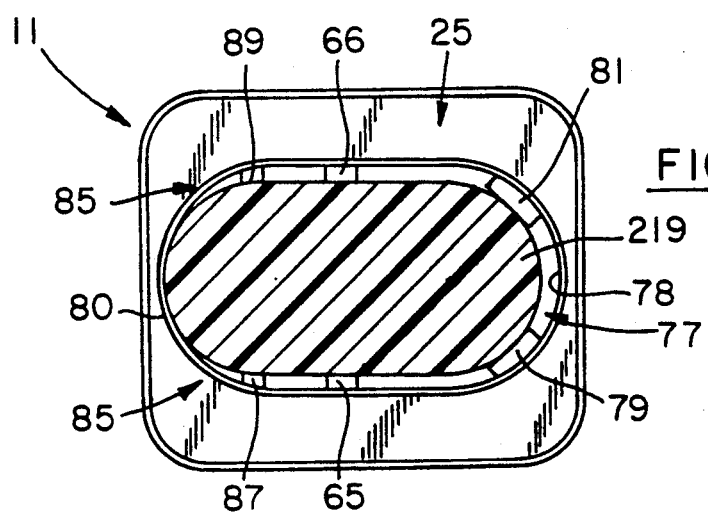
FIG. 8 is a top plan view of the charger receptacle of FIG. 2 with a small oval pack mounted in the receptacle. The pack is cross-sectioned in a plane coplanar with the plane of the receptacle opening.
Figure 9:
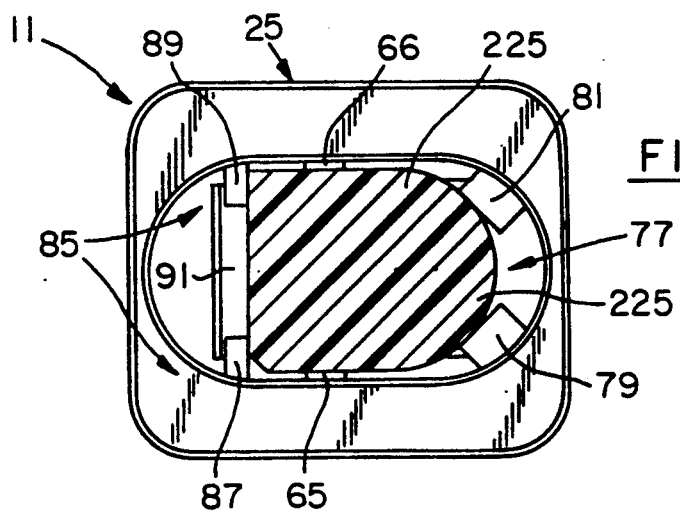
FIG. 9 is a top plan view of the charger receptacle of FIG. 2 with a D-shaped pack mounted in the receptacle. The pack is cross-sectioned in a plane coplanar with the plane of the receptacle opening.

The preferred embodiment of a charger 11 is configured to receive alternatively for charging, one at a time, battery packs having three different shapes, namely, the large oval pack 213 shown in FIG. 10, the small oval pack 219 shown in FIG. 11 and the illustrate D-shaped pack 225 shown in FIG. 12. FIGS. 7-9 the manner in which packs 213, 219, 225 fit in charger 11, respectively. As shown in FIGS. 1, 2, the battery charger 11 in accordance with the invention comprises a housing. As embodied herein, charger 11 comprises a housing 19, preferably made of injection molded plastic, having a display panel 21, a louvered top wall 23 and a bottom wall 24. Housing 19 contains a charger circuit (not shown) fixed to circuit board 22 and suitable for charging battery packs preferably comprised of nickel-cadmium cells and having different pack voltages. Housing 19 is preferably oriented with top wall 23 facing vertically upward. As will be apparent, housing 19 may be used in any orientation. Terms such as left, right, front, rear, top, bottom, horizontal and vertical are used to describe the charger as depicted in the drawing in its preferred orientation, are used for convenience and are not intended to limit the invention to a particular orientation.

According to the invention, a receptacle is formed in the housing for alternatively receiving a plurality of battery packs having different cross-sectional areas. The receptacle has an opening formed in the housing wall and circumtending a first area, and a sidewall. The area of the opening corresponds approximately to the transverse cross-sectional area of one of the plurality of the packs. As embodied herein, a receptacle 25 (FIGS. 2, 3, 6) is formed in housing 19 for alternatively receiving battery packs 213, 219, 225 having different cross-sectional areas. Receptacle 25 has an opening 27 in housing wall 23 and circumtending a first area, and a sidewall 29. As shown in FIG. 7, the area of opening 27 corresponds approximately to the transverse cross-sectional area of one of the plurality of packs, namely, pack 213. Receptacle 25 further includes a floor 31 opposed to receptacle opening 27, an oval cavity 33, a rectangular cavity 35 separated from oval cavity 33 by a transverse portion 37 of sidewall 29. A contact terminal pedestal 39 extends upwardly from floor 31 of cavity 33. Oval cavity 35 corresponds generally to the size and shape of oval segment 218 of pack 213 extending between shroud 217 and rectangular segment 220. Rectangular cavity 35 corresponds generally to the size and shape of shroud 217. A portion of cavity 35 which extends between an edge 41 of floor 31 and end wall 43 is unfilled by shroud 217 due to the need to space components interacting with receptacle 25. As is seen, receptacle 25 is sized and shaped to generally conform to the shape of the large oval pack 213 (i.e., the segments 217, 218 which are received in receptacle 25).

Figure 3:
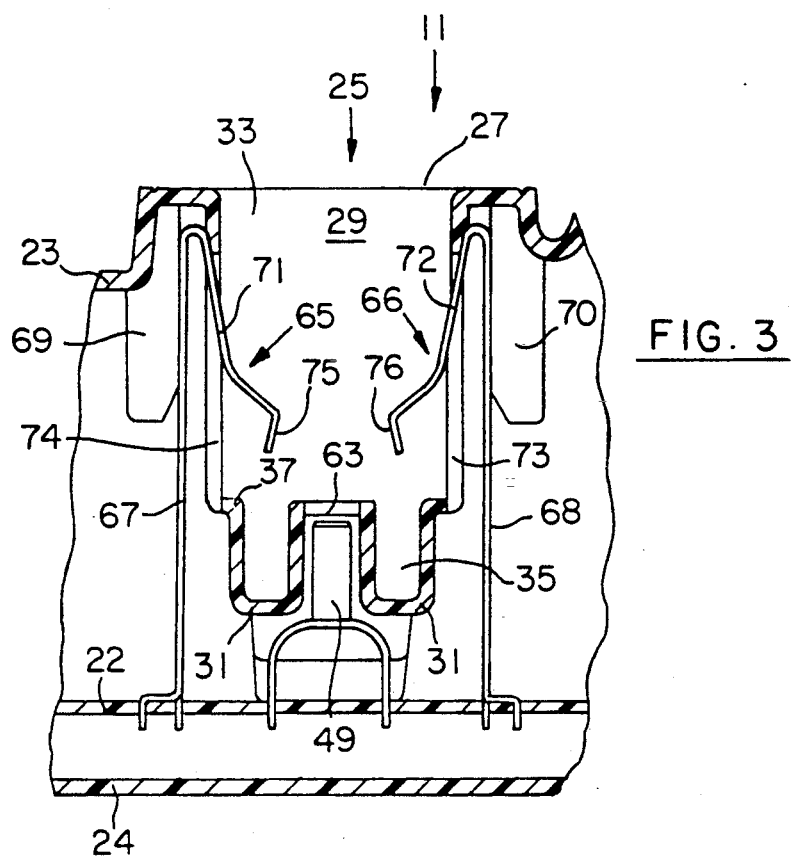
FIG. 3 is a cross-sectional view of the charger receptacle taken along line 3—3 of FIG. 2. Background parts are not shown for clarity.

In accordance with the invention, electrical contacts are provided in the receptacle for electrically contacting the respective terminals of the plurality of packs. As embodied herein, as shown in FIGS. 2, 3 and 6, electrical contacts 47, 49, 65, 66 are provided in receptacle 25 for electrically contacting the respective terminals of the plurality of packs 213, 219, 225. A first identical pair 47, 49 of the electrical contacts are electrically connectable respectively to the terminals 214 for pack 213 when pack 213 is inserted into receptacle 25. Contacts 47, 49 are housed within pedestal 39, extend from board 22 and are accessible to terminals 214 through openings 59. Insulator 215, which separates pack terminals 214, is received in a central opening 63 in pedestal 39. A second identical pair 65, 66 of the electrical contacts, each of which extends from sidewall 29 at mutually opposed positions, is electrically connectable to the terminals of a second pack (either terminals 221 of pack 219 or terminals 227 of pack 225) when the second pack is inserted into receptacle 25. Each contact 65, 66 has a cantilevered base 67, 68 supported on board 22 and a tabs 71, 72 extending through a sidewall opening 73, 74 and terminating in a reduced width projection 75, 76. A cantilevered rib 69, 70 extends from wall 23 behind contacts 65, 66 and retains each contact base 67, 68 at a 90° angle relative to board 22 to maintain tabs 71, 72 properly oriented relative to openings 73, 74.

In accordance with the invention, a pack locater is provided in the receptacle for biasing a second of the plurality of packs into a location in the receptacle to contact the electrical contacts. The locater is resiliently retractable when the first pack is inserted into the receptacle. The second pack has a transverse cross-sectional area less than the area of the receptacle opening. As embodied herein, as best shown in FIGS. 2, 4 and 6, a pack locater 77 in receptacle 25 biases a second (either pack 219 or pack 225) of the plurality of packs 213, 219, 225 into a location in receptacle 25 to contact electrical contacts 65, 66. As shown in FIG. 8, locater 77 is resiliently retractable in the first pack 213 is inserted into receptacle 25. The second pack 219, 215 has a transverse cross-sectional area less than the area of the receptacle opening 27. As shown in FIG. 8 when the second pack is of the small oval type shown in FIG. 11, locater 77 extends outwardly from a first position 78 on sidewall 29 and biases the second pack 219 into engagement with the sidewall 29 at a second position 80 opposed to the first position 78. As shown in FIG. 9 when the second pack is of the D-shaped type shown in FIG. 12, locater 77 extends outwardly from a first position 78 on sidewall 29 and biases the second pack 225 toward second position 80 (but not in contact with sidewall 29) as will be explained in more detail below. The biasing of pack 219 by locater 77 into engagement with sidewall 29 at the second position 80 (i.e., a fixed reference point) ensures that pack terminals 221 are properly aligned with electrical contacts 65, 66. The location of contacts 65, 66 along a longitudinal axis 83 bisecting oval cavity 33 of receptacle 25 is determined by positioning contacts 65, 66 at a distance from second position 80 equal to the corresponding distance of terminals 221 from the portion of sidewall 223 which engages receptacle sidewall 29 at position 80.

Pack locater 77 (FIGS. 2, 4) is preferably comprised of an identical pair of resilient cantilevered fingers 79, 81 extending from board 22 and having tips extending through openings 82 (only one shown) in receptacle 25 at spaced positions symmetrically located relative to longitudinal axis 83 of receptacle 25 and function to bias the second pack 219 into engagement with sidewall 29 at the second position 80 (defined by the intersection of longitudinal axis 83 with sidewall 29) opposite to the first position 78 (defined by the intersection of axis 83 with sidewall 29). A cantilevered rib 84 extends downwardly from wall 23 behind the base 86 of each finger 79, 81 and retains the base of each finger at a right angle relative to board 22 to maintain the finger tips 88 properly oriented relative to openings 82.

Alternatively, the pack locater may be constituted by a single resilient member (not shown) located at the first location 78 and functioning to bias pack 219 into engagement with sidewall 29 at the second opposed position 80.

As best shown in FIGS. 2, 5 and 6, charger 11 may further comprise an abutment 85 spaced from locater 77 and extending from sidewall 29 into receptacle 25 for abutting a third pack 225 having a transverse cross-sectional area smaller than the area of receptacle opening 27 and smaller than the transverse cross-sectional area of second pack 219. As shown in FIG. 9, when third pack 225 is inserted into receptacle 25, pack locater 77 biases pack 225 into engagement with abutment 85 and into a location wherein pack terminals 227 are properly aligned with electrical contacts 65, 66. Abutment 85 serves as a fixed reference surface against which pack 225 is located. The location of abutment 85 along longitudinal axis 83 and receptacle 25 is determined by making the distances along axis 83 between contact 65, 66 and abutment 85 equal to the distance between pack terminals 227 and the portion of side pack, sidewall 229 which engages abutment 85.

As shown in FIGS. 5, 6, abutment 85 is preferably comprises two arms 87, 89 extending respectively into receptacle 25 through openings 101, 103 at opposed positions in sidewall 29. As shown in FIG. 5, abutment 85 is preferably an integrally formed U-shaped member having two arms 87, 89 extending upwardly from a base 91 in the direction of a vertical axis 92. Abutment 85 (FIG. 6) is supported in a channel shaped support 93 extending downwardly from a receptacle 25. Support 93 has a pair of channel walls 95, 97 extending alongside abutment base 91 and a channel base 99 extending below abutment base 91. Abutment 85 is loosely held in support 93 and is slidable back and forth between channel base 99 and the top of openings 101, 103 along the direction of axis 92.

As shown in FIGS. 7, 8, abutment 85 is resiliently retracted from receptacle 25 through openings 101, 103 to the extent necessary to permit insertion of pack 213 or pack 219. Because pack 213 substantially fills receptacle 25, arms 87, 89 are substantially fully retracted from receptacle 25 through sidewall 29 when pack 213 is inserted. And, because the transverse cross-sectional area of pack 219 is less than that of oval cavity 33, arms 85, 87 are partially retracted from receptacle 25 when pack 219 is inserted.

In operation, as shown in FIG. 7, receptacle 25 is sized and shaped to generally conform to the shape of the large oval pack 219. When pack 213 is in receptacle 25, contacts 65, 66, pack locater 77 and abutment 85 serve no function and are substantially retracted from receptacle 25 by engagement with pack sidewall 216 as pack 213 is inserted into receptacle 25. Sidewall 216 engages pack locater 77 constituted by cantilevered spring fingers 79, 81 and rearwardly pushes fingers 79, 81 outwardly from receptacle 25 through openings 82, 84. Also, pack sidewall 216 engages abutment 85 constituted by resilient cantilevered arms 87, 89 and pushes arms 87, 89 outwardly of receptacle 25 through openings 101, 103. And lastly, pack sidewall 216 engages contacts 65, 66 pushes contact projection 75, 76 outwardly of receptacle 25 through openings 73, 74. Also upon insertion of pack 213 into receptacle 25, pack terminals 214 are inserted through openings 59 in pedestal 39 to make electrical contact with contacts 47, 49.

Upon removal of pack 213, pack locater fingers 79, 81, abutment arms 87, 89 and contacts 65, 66 are resiliently biased to spring back into receptacle 25 into the locations shown in FIGS. 1-6. With the pack locater 77 and abutment 85 in the locations shown in FIGS. 1, 2, the receptacle is again conditioned to receive any one of packs 213, 219, 225.

As shown in FIG. 8, when pack 219 is inserted into oval cavity 33 of receptacle 25, an end wall 224 of pack 219 engages and is supported by the upper surface of pedestal 39. Also, locater fingers 79, 81 engage pack sidewall 223 and bias an opposed portion of pack sidewall 223 into engagement with receptacle sidewall 29 at position 80. With pack 219 located by locater 77, receptacle sidewall 29 (position 80) and the upper surface of pedestal 39, pack terminals 221 are properly aligned to make electrical contact with projections 75, 76 of contacts 65, 66. Abutment arms 87, 89 engage opposed portions of pack sidewall 223 and aid in retaining pack 219 centrally located of and aligned along longitudinal axis 83. Upon removal of pack 219, pack locaters 77 and abutment 85 are restored into their stable positions shown in FIGS. 1-6.

As shown in FIG. 9, when pack 225 is inserted into oval cavity 33 of receptacle 25 between abutment 85 and pack locater 77, pack locater 77 engages sidewall 229 and biases pack 225 into engagement with abutment 85, and an end wall 231 of pack 225 engages and is supported by pedestal 39. With pack 225 located by abutment 85, locater 77 and the upper surface of pedestal 39, pack terminals 227 are aligned with and make electrical contact with projection 75, 76 of contacts 65, 66.

Figure 13:
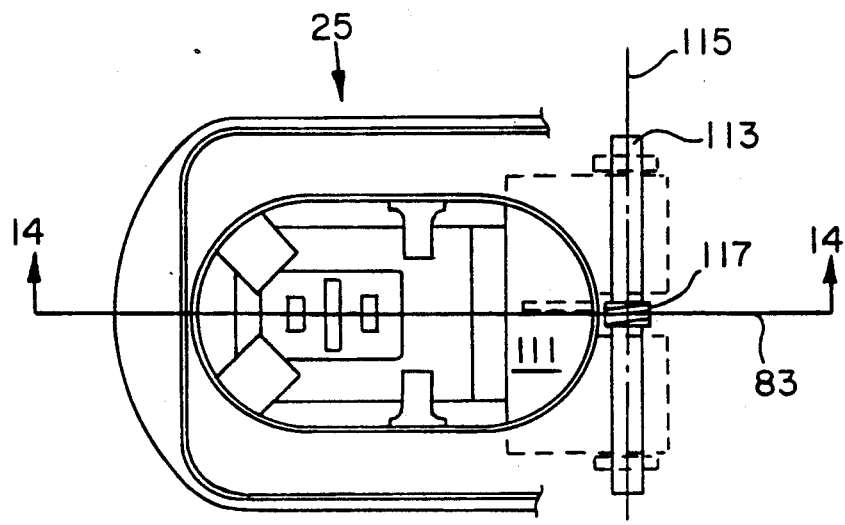
FIG. 13 is a top plan view of a receptacle of a charger in accordance with a second nonpreferred embodiment of the invention.
Figure 14:
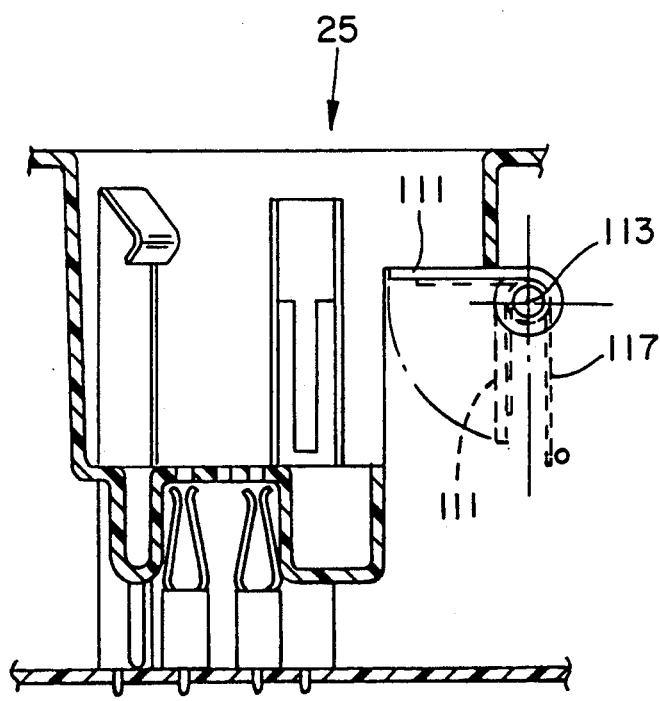
FIG. 14 is a cross-sectional view of the charger receptacle taken along lines 14—14 of FIG. 13.

FIGS. 13, 14 show a second embodiment of the invention wherein a modified form of the abutment is utilized. The second embodiment is identical to the embodiment of FIGS. 1-9 except that a modified abutment 111 is substituted for abutment 85. FIGS. 13, 14 have been simplified to show only the modified abutment 111 in receptacle 25. In the second embodiment, abutment 111 is constituted by a trap door pivotably mounted on an axle 113 about an axis 115 perpendicular to axis 83 and movable responsive to the insertion of pack 213 or pack 219 between a first position shown in solid lines in FIG. 14 and a second position shown in dotted lines in FIG. 14. In the first position, door 111 extends parallel to and partially covers opening 27 and abuts pack 225 when inserted in receptacle 25. In the second position, door 111 is retracted out of receptacle 25 to the extent necessary for the insertion of pack 213 or pack 219. Door 111 is spring biased by a spring 117 so as to be stably located in the first position and is movable into the second position against the bias of the spring.

Figure 15:
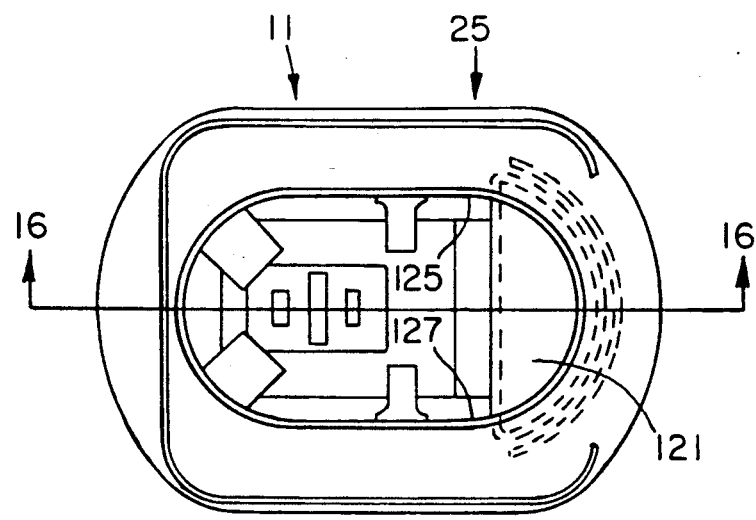
FIG. 15 is a top plan view of a receptacle of a charger in accordance with a third nonpreferred embodiment of the invention.
Figure 16:
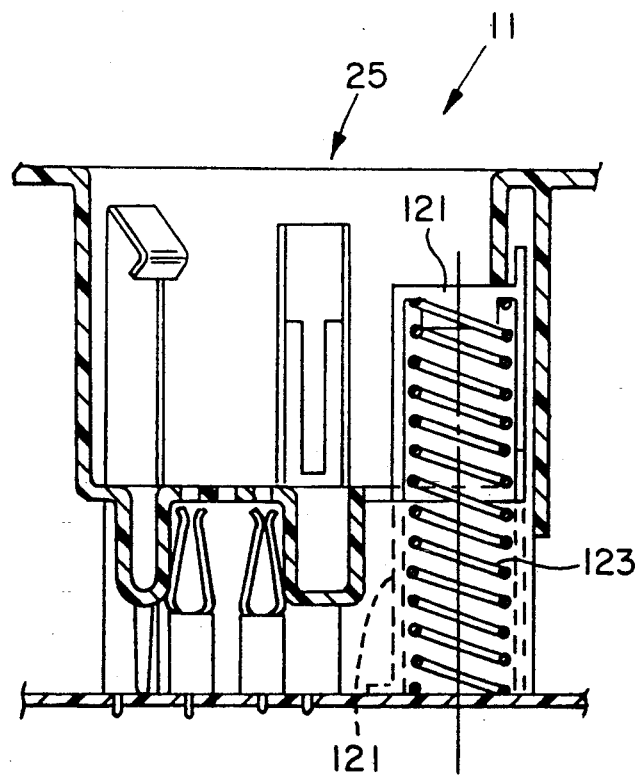
FIG. 16 is a cross-sectional view of the charger receptacle taken along lines 16—16 of FIG. 15.

FIGS. 15, 16 show a third embodiment of the invention wherein a second modified form of the abutment is utilized. The third embodiment is identical to the first embodiment shown in FIGS. 1-9 except that a modified abutment 121 is substituted for abutment 85. FIGS. 15, 16 have been simplified to show only the modified abutment 121 in receptacle 25. In the third embodiment, abutment 121 is constituted by a sliding platform 121 which is movable responsive to the insertion of pack 213 or pack 219 between a first position shown in solid lines in FIG. 15 and a second position shown in dotted lines in FIG. 15. In the first position, platform 121 extends parallel and partially covers opening 27 and abuts pack 225 when inserted in receptacle 25. In the second position, platform 121 is retracted out of oval cavity 33 of receptacle 25 by being slid below transverse sidewall 37 and into rectangular cavity 35. Platform 121 is spring biased by a coil spring 123 extending between board 22 and platform 121 so as to be stably located in the first position and is movable into the second position against the bias of spring 123. Movement of platform 121 in cavity 35 is guided by an arcuate wall and edges 127, 129 of sidewall 29.

In accordance with the invention, charger 11 is adapted to receive a plurality of diverse battery pack designs for recharging. Receptacle 25 substantially conforms to the shape of large oval pack 213 and with minor modification is adapted to receive other diverse battery pack designs. Thus charger 11 has greatly improved versatility and has a manufacturing cost only slightly greater than that attributable to a specialized charger only for the large oval pack 213.

It will be recognized by those skilled in the art that the invention may be practiced in accordance with various modifications. For example, additional abutments may be provided to adapt receptacle 25 to accommodate still other battery pack designs having dimensions different from the D-shaped pack 225. In accordance with another modification, to stabilize the location of pack 219 in receptacle 25, receptacle 25 may include a "V"-shaped or radiused recess located at position 80 and extending between opening 27 and transverse sidewall 37. The recess is shaped to more closely match the shape of sidewall 223 of pack 219 and thus adds stability to pack 219 in receptacle 25. It will be apparent to those skilled in the art that these and other modifications can be made to the charger of the present invention without departing from the scope or spirit of the invention as defined by the appended claims and their equivalents.

We claim:

1. A battery charger comprising:
a housing having a wall;
a receptacle for alternatively receiving a plurality of battery packs having different cross-sectional areas, said receptacle having a sidewall and an opening formed in the housing wall and circumscribing a first area, the area of the opening corresponding approximately to the transverse cross-sectional area of a first of the plurality of packs;
electrical contacts in the receptacle for electrically contacting the respective terminals of the plurality of packs; and
a pack locator in the receptacle and spaced from the electrical contacts, said locator for biasing a second of the plurality of packs into a location in the receptacle to contact the electrical contacts, said locator being resiliently retractable when the first pack having a transverse cross-sectional area less than the area of the receptacle opening.

2. The charger of claim 1 wherein the locater extends outwardly from a first position on the sidewall and biases the second pack into engagement with the sidewall at a second position opposed to the first position.

3. The charger of claim 1 further comprising:
a retractable abutment spaced from the locater and extending from the sidewall into the receptacle for abutting a third pack having a transverse cross-sectional area smaller than the area of the receptacle opening and smaller than the transverse cross-sectional area of the second pack, said abutment being resiliently retractable from the receptacle when the first pack is in the receptacle; and
the locater biasing the third pack inserted into the receptacle toward and into engagement with the abutment.

4. The charger of claim 3 wherein:
the abutment comprises two arms extending respectively into the receptacle from opposed positions on the sidewall; and
the arms are resiliently retractable into the sidewall when the first pack is inserted into the receptacle.

5. The charger of claim 3 wherein:
the abutment comprises a door pivotally mounted relative to the receptacle and movable responsive to the insertion of the second or third pack between a first position and a second position;
in the first position, the door extends parallel to and partially covers the receptacle opening;
in the second position, the door is retracted out of the receptacle when the first pack or the second pack is inserted; and
a spring biases the door from the second position to the first position.

6. The charger of claim 3 wherein:
the abutment comprises a slidable platform movable relative to the receptacle, responsive to the insertion of the first pack or the second pack, between a first position and a second position;
in the first position, the platform extends parallel to and partially covers the receptacle opening and abuts the third pack when inserted into the receptacle;
in the second position, the platform is retracted out of the receptacle; and
a spring biases the platform from the second position to the first position.

7. The charger of claim 1 further comprising:
a pair of resilient arms extending, respectively, into the receptacle from opposed positions on the sidewall for forming an abutment for a third pack inserted into the receptacle and having a transverse cross-sectional area smaller than the area of the receptacle opening and smaller than the transverse cross-sectional area of the second pack; and
the locater comprising a pair of adjacent spaced fingers extending outwardly from a first position on the sidewall for biasing the second pack into engagement with the sidewall at a second position opposite to the first position and for biasing the third pack inserted into the receptacle toward and into engagement with the pair of arms.

8. The charger of claim 1 wherein:
the receptacle has a floor opposed to the receptacle opening; and
the electrical contacts include a first pair of electrical contacts extending through the receptacle floor, said first pair of contacts electrically connectable respectively to the terminals of the first pack when the first pack is inserted into the receptacle and a second pair of electrical contacts, each contact of the second pair extends from the sidewall at mutually opposed positions, the second pair of contacts is electrically connectable to the terminals of second pack when the second pack is inserted into the receptacle.

9. A battery charger comprising:
a housing having a wall;
a receptacle for alternatively receiving a plurality of battery packs having different cross-sectional areas, said receptacle having a sidewall and an opening formed in the housing wall and circumscribing a first area, the area of the opening corresponding approximately to transverse cross-sectional area of a first of the plurality of packs;
electrical contacts in the receptacle for electrically contacting the respective terminals of the plurality of packs; and
a retractable abutment spaced from the electrical contacts and extending from the sidewall into the receptacle said abutment (1) for abutting a second of the plurality of packs having a transverse cross-sectional area smaller than the area of the receptacle opening and smaller than the transverse cross-sectional area of the first pack, (2) for locating the second pack in a position to contact the electrical contacts, and (3) being resiliently retractable from the receptacle when the first pack is in the receptacle.

10. The charger of claim 9 further comprising a pack locator in the receptacle for biasing the second pack inserted into the receptacle toward and into engagement with the abutment.

11. The charger of claim 10 wherein the pack locator biases a third of the plurality of packs into a location in the receptacle to contact the electrical contacts and is resiliently retractable when the first pack is inserted into the receptacle, the third pack having a transverse cross-sectional area less than the area of the receptacle opening.

12. The charger of claim 11 wherein the pack locator extends outwardly from a first position on the sidewall and biases the second pack into engagement with the sidewall at a second position opposed to the first position.

13. The charger of claim 9 wherein:
the abutment comprises two arms extending respectively into the receptacle from opposed positions on the sidewall; and
the arms are resiliently retractable into the sidewall when the first pack is inserted into the receptacle.

14. The charger of claim 13 wherein:
the locator comprises a pair of adjacent spaced fingers extending outwardly from a first position on the sidewall for biasing the third pack into engagement with the sidewall at a second position opposite to the first position and for biasing the second pack inserted into the receptacle toward and into engagement with the pair of arms.

15. The charger of claim 9 wherein:
the abutment comprises a door pivotally mounted relative to the receptacle and movable responsive to the insertion of the second or third pack between a first position and a second position;
in the first position, the door extends parallel to and partially covers the receptacle opening;

in the second position, the door is retracted out of the receptacle when the first pack or the second pack is inserted; and
a spring biases the door from the second position to the first position;

16. The charger of claim 9 wherein:
the abutment comprises a slidable platform movable relative to the receptacle, responsive to the insertion of the first pack or a third pack, between a first position and a second position;
in the first position, the platform extends parallel to and partially covers the receptacle opening and abuts the second pack when inserted into the receptacle;
in the second position, the platform is retracted out of the receptacle; and
a spring biases the platform from the second position to the first position.

17. The charger of claims 9 or 12 wherein:
the receptacle has a floor opposed to the receptacle opening; and
the electrical contacts include a first pair of electrical contacts extending through the receptacle floor, said first pair of contacts electrically connectable respectively to the terminals of the first pack when the first pack is inserted into the receptacle and a second pair of electrical contacts, each contact of the second pair extends from the sidewall at mutually opposed positions, the second pair of contacts is electrically connectable to the terminals of the second pack when the second pack is inserted into the receptacle.

18. A battery charger comprising:
a housing having a wall;
a receptacle for alternatively receiving a plurality of battery packs having different cross-sectional areas, said receptacle having a sidewall and an opening formed in the housing wall and circumscribing a first area, the area of the opening corresponding approximately to transverse cross-sectional area of a first of the plurality of packs;
electrical contacts in the receptacle for electrically contacting the respective terminals of the plurality of packs; and
a retractable, pack positioning means in the receptacle and spaced from the electrical contacts, the pack positioning means for positioning a second of the plurality of packs in a location in the receptacle to contact the electrical contacts and being resiliently retractable when the first pack is inserted into the receptacle, the second pack having a transverse cross-sectional area less than the area of the receptacle opening.

19. The charger of claim 18 wherein the positioning means comprises a pack locator for biasing the second pack into the location in the receptacle to contact the electrical contacts, and the pack locator being resiliently retractable when the first pack is inserted into the receptacle.

20. The charger of claim 18 wherein the positioning means comprises a retractable abutment extending from the sidewall into the receptacle for abutting the second pack, said abutment locating the second pack in the position to contact the electrical contacts, and said abutment being resiliently retractable from the receptacle when the first pack is in the receptacle.

21. The charger of claim 20 wherein the positioning means further comprises a pack locator for biasing the second pack into the location in the receptacle to contact the electric contacts, and the pack locator being resiliently retractable when the first pack is inserted into the receptacle.

* * * * *